United States Patent Office 3,448,628
Patented June 10, 1969

3,448,628
DEVICE FOR TENSIONING THE DRIVING CHAIN IN A BICYCLE EQUIPPED WITH COASTER BRAKE AND EXPOSED SPEED CHANGE MECHANISM
Keizo Shimano and Masashi Nagano, Sakai, Japan, assignors to Shimano Kogyo Kabushiki Kaisha, Sakai, Japan
Filed May 31, 1967, Ser. No. 642,372
Claims priority, application Japan, June 7, 1966, 41/36,895
Int. Cl. F16h 11/08
U.S. Cl. 74—217       3 Claims

ABSTRACT OF THE DISCLOSURE

This invention relates to a driving chain tensioning device in a bicycle equipped with a coaster brake adapted to be put into operation by rotating the front sprocket in the reverse direction, and an exposed speed change mechanism comprising a plurality of rear sprocket wheels of different number of teeth and a speed change lever for selecting any one of said rear sprocket wheels.

---

In the conventional bicycle equipped with such type of coaster brake and speed change mechanism, slackening of the lower run of the driving chain during the rotation of the front sprocket in the normal direction may be absorbed by the action of the said change lever of the speed change mechanism. However, at the time of applying coaster brake by rotating the front sprocket in the reverse direction, the upper run of the driving chain would be slackened, so that there would happen that the upper run of the driving chain often be disengaged from the front sprocket upon changing the direction of rotation from the reverse into the normal direction. Accordingly, the primary object of the present invention is to provide an improved device for tensioning of the upper run of the driving chain in a bicycle equipped with coaster brake as well as the exposed speed change mechanism.

Other objects of the present invention will become apparent from the following detailed description taken in conjunction with the accompanying drawings, wherein.

Figure 1:
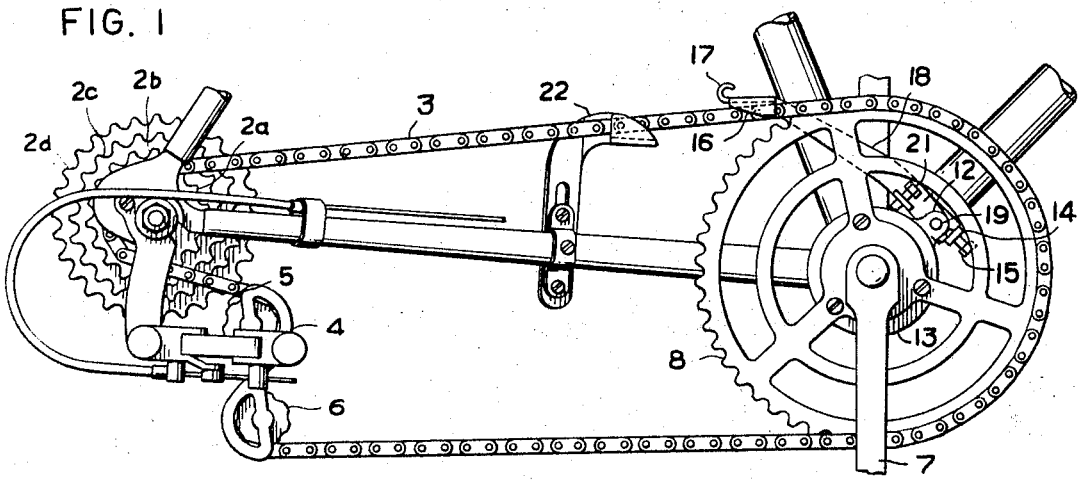
FIGURE 1 is a side view of the chain tensioning device forming an embodiment of the present invention in the position when the bicycle chain is running in the normal direction.
Figure 2:
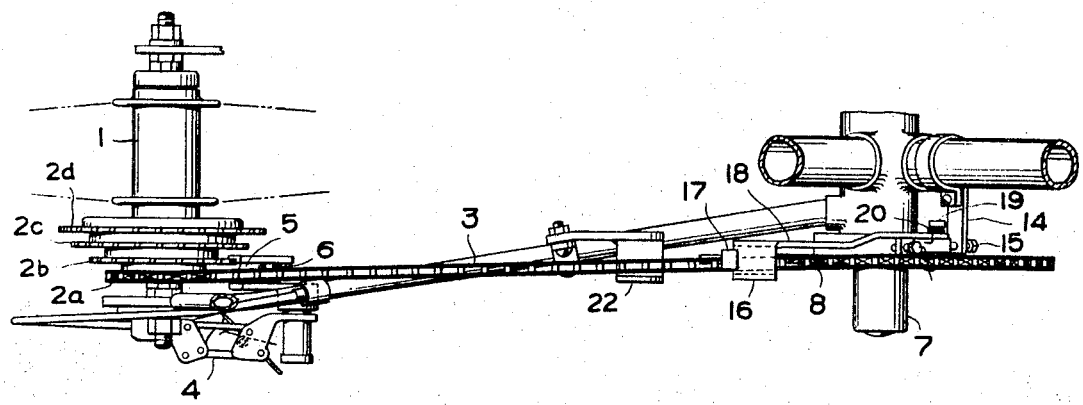
FIGURE 2 is a plan view thereof.
Figure 3:
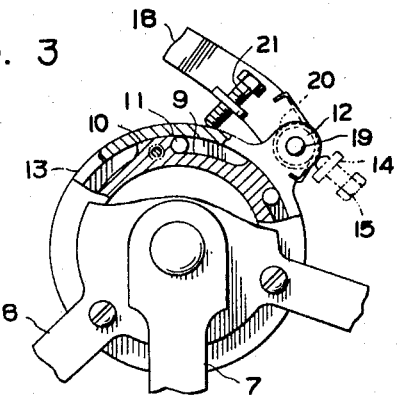
FIGURE 3 shows the detail, partly in section, of a part of the front chain sprocket.
Figure 4:
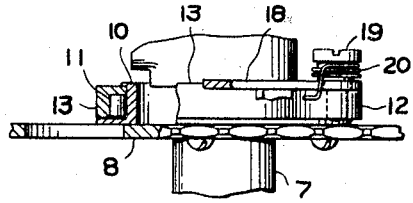
FIGURE 4 is a plan view thereof, with a part broken away.
Figure 5:
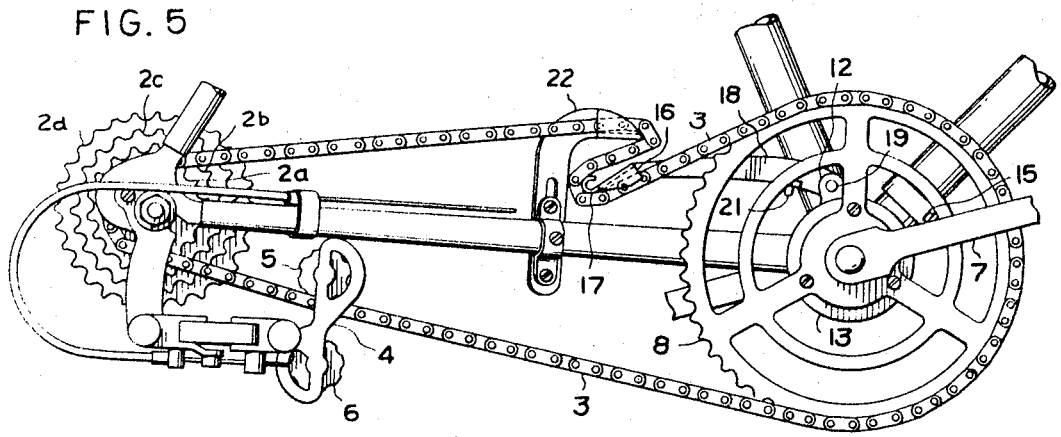
FIGURE 5 is a side view of the driving chain tensioning device, with the chain tensioned in the position when the coaster brake is applied.

Coaster brake for a bicycle is usually built in the rear hub 1 and, in the embodiment of the present invention shown in FIGS. 1 and 2, the speed change gear comprises a plurality of sprocket wheels 2a, 2b, 2c and 2d of different numbers of teeth arranged on the righthand end portion of the rear hub 1, the smallest sprocket wheel being disposed outermost. Adjacent said multi-stage sprocket wheel assembly, there is provided a change-over lever 4 having a guide sprocket wheel 5 and a tensioning sprocket wheel 6, and the lower run of the chain 3 is ordinarily wound around said sprocket wheels 5 and 6 forming a S-shaped path as shown in FIG. 1, whereby the lower run of the driving chain 3 is normally maintained in tensioned condition. It is to be understood that the above described part of the device is not forming a part of the present invention, and is old in this type of the conventional coaster brake with exposed speed-change mechanism. In the conventional speed-change mechanism with coaster brake of such type, in order to prevent slackening of the upper run of the chain 3, according to the present invention, there is securely mounted on the boss of the front chain sprocket 8 having a righthand pedal crank 7, an inner ring 10 having a plurality of circumferentially arranged slots 9, each slot being deeper at one end and shallower at the other end, as shown FIG. 3. In each of said slots 9, there is inserted a ball 11. The inner ring 10 is surrounded by an outer ring 13 having a mounting ear 12. The forward movement of said ring 13 is limited by means of an adjustable setscrew 15 carried by a threaded bracket 14 affixed to the tubular frame of the seat, the parts being so arranged that the outer ring 13 does not rotate according to the rotation of the inner ring 10 in the normal direction, because of the fact that the ball 11 is maintained in the deepest portion of the slot 9 when the front sprocket 8 rotates in the normal direction, and the transmission of power from the inner ring 10 to the outer ring 13 is prevented. On the contrary, when the front sprocket 8 is rotated in the reverse direction for the purpose of applying coaster brake, the ball 11 is so dimensioned as to be transferred to the shallower portion of the slot 9, so that the outer ring 13 is rotated in the reverse direction. There is provided a chain suppressing lever 18 pivotally mounted to the mounting ear 12 of the outer ring 13 by means of a pivot 19, and the lever 18 has at its free end a channel 16 opening downwardly and a guide hook 17 bent upwardly. A coil spring 20 (FIG. 4) has tendency of oscillating the lever 18 downwardly. The lever 18 is provided with an adjusting screw 21 abutting against the outer ring 13, as shown in FIG. 3. Normally the lever 18 is kept oscillated rightwardly, allowing thereby the upper run of the chain 3 to maintain the tensioned normal position. On the contrary, when the outer ring 13 is rotated in reverse direction for applying brake, while the lower run of the chain is pulled forwardly to be tensioned, the upper run of the chain is pushed rearwardly as shown in FIG. 5. At the same time, the suppressing lever 18 is rocked downwardly, thereby the channel 16 thereof will press down the slackened portion of the upper run of the chain. It is preferable that the upper run of the chain is, during the normal operation, maintained in the position somewhat lower than the uppermost position of the front sprocket 8 to avoid any hindrance for running. For the purpose, there is provided an upright support 22 having its upper end bent forwardly (in FIG. 5 rightwardly) and which is securely mounted to a chain stay as shown. When the upper run of the chain is pressed down by the lever 18 by reason of the rotation of the sprocket 8 in reverse direction for applying brake, the upper run of the chain will take S-shaped path at the front of said upright support 22 as shown in FIG. 5.

From the foregoing it will be seen that according to the present invention, when applying the coaster brake the upper run of the chain which usually tends to be slackened at a position adjacent the front sprocket 8 may be held in tensioned position by means of the suppressing lever 18 which is adapted to be quickly put into operation by the rotation of the front sprocket in reverse direction, and that in changing the rotation into the normal direction the upper run of the chain may be guided to be quickly returned to the straight path under tension. Consequently, the disadvantages derived from the exposed speed-change mechanism cooperating with the coaster brake may be effectively overcome.

What we claim is:
1. In a bicycle with a frame-supported rear hub in- cluding a coaster brake and an exposed speed change mechanism comprising a plurality of sprocket wheels of different numbers of teeth operatively connected to a frame-supported front driving sprocket by means of a driving chain having upper and lower runs, a chain tensioning device characterized by and comprising a suppressing lever pivotably mounted to said front driving sprocket and having at its free end a generally forwardly bent channeled guide hook with the channel opening downwarly, means enabling said hook to engage the upper run of said driving chain, means for positioning said suppressing lever in a normally inoperative position during forward rotation of said front driving sprocket, and upon reverse rotation of said front driving sprocket means to move said lever to suppress the upper run of said driving chain, whereby the upper run of the driving chain tending to be slackened is held tensioned during the application of the coaster brake.

2. In a bicycle with a frame-supported rear hub including a coaster brake and an exposed speed change mechanism comprising a plurality of sprocket wheels of different numbers of teeth operatively connected to a frame-supported front driving sprocket having an annular boss thereon by means of a driving chain having upper and lower runs, a chain tensioning device characterized by and comprising a composite ring assembly including an inner ring fixedly mounted on the boss of said front sprocket for rotation therewith and being provided in its outer periphery with a plurality of circumferentially arranged tapered slots; each slot being of deeper depth at one end and shallower depth at the other end and each slot containing a ball therein, said ball having a diameter substantially greater than the shallower depth portion of the slot, but substantially equal to but not less than the deeper depth portion, and said balls normally reposing in the deeper portion of said respective slots when the front sprocket rotates in the normal forward direction, a relatively rotatable outer ring surrounding and freely engaging on said inner ring and balls, said outer ring normally not rotating relative to said inner ring when the front sprocket freely rotates normally in its forward driving direction; said outer ring rotating relative to the inner ring only responsive to reverse rotation of said front sprocket during application of the coaster brake, whereupon said balls tend to move in their tapered slots to the shallower depth portion thereby engaging with and effecting rotation of said outer ring relative to said inner ring; and a suppressing lever including means for pivotally mounting it to said outer ring, said suppressing lever having its free end directed toward the rear hub and having at its free end a channel hook opening downwardly and being adapted to engage with and suppress the upper run of said driving chain when the said front driving sprocket is rotated in reverse direction.

3. A chain tensioning device as defined in claims 1 or 2 further including bicycle frame means including a frame member extending between and supporting said front sprocket and said rear hub, an upright support securely mounted to said frame member, said upright support includes means adapted to support the upper run of the driving chain adjacent the position in which said suppressing lever acts to depress the upper run of the driving chain.

References Cited

FOREIGN PATENTS 522,419   4/1955   Italy.

FRED C. MATTERN, JR., *Primary Examiner.*

J. A. WONG, *Assistant Examiner.*

U.S. Cl. X.R.

74—242.1; 192—6; 280—238